March 17, 1964  R. N. MOORE  3,125,195
ARCHITECTURAL SCREEN
Filed May 20, 1959
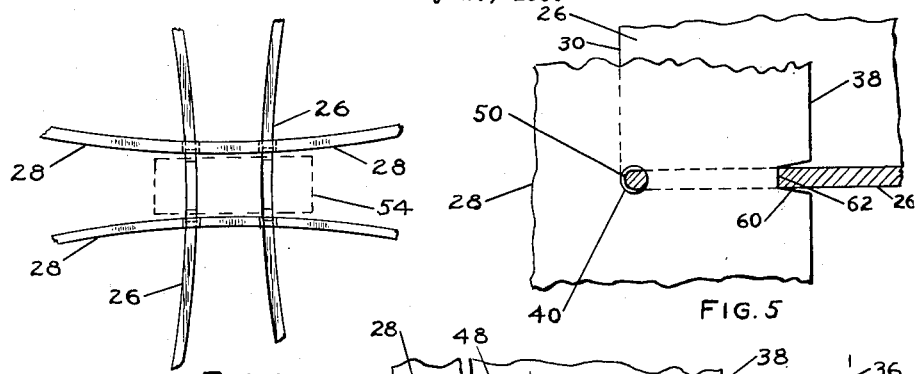
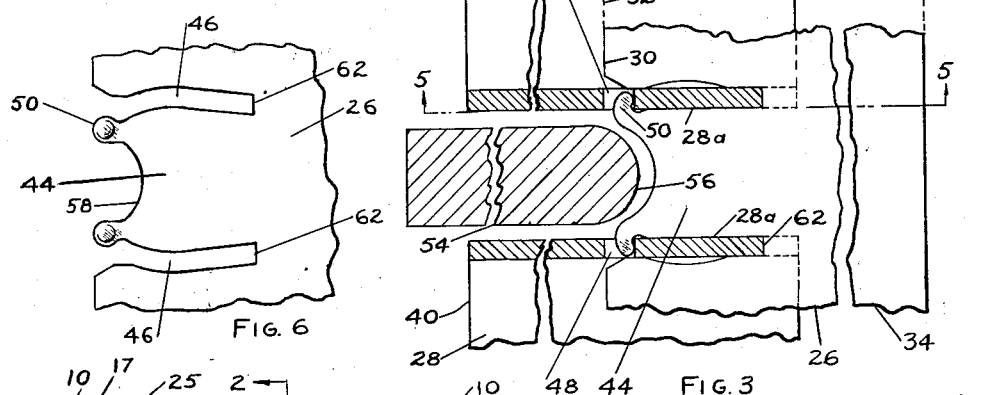
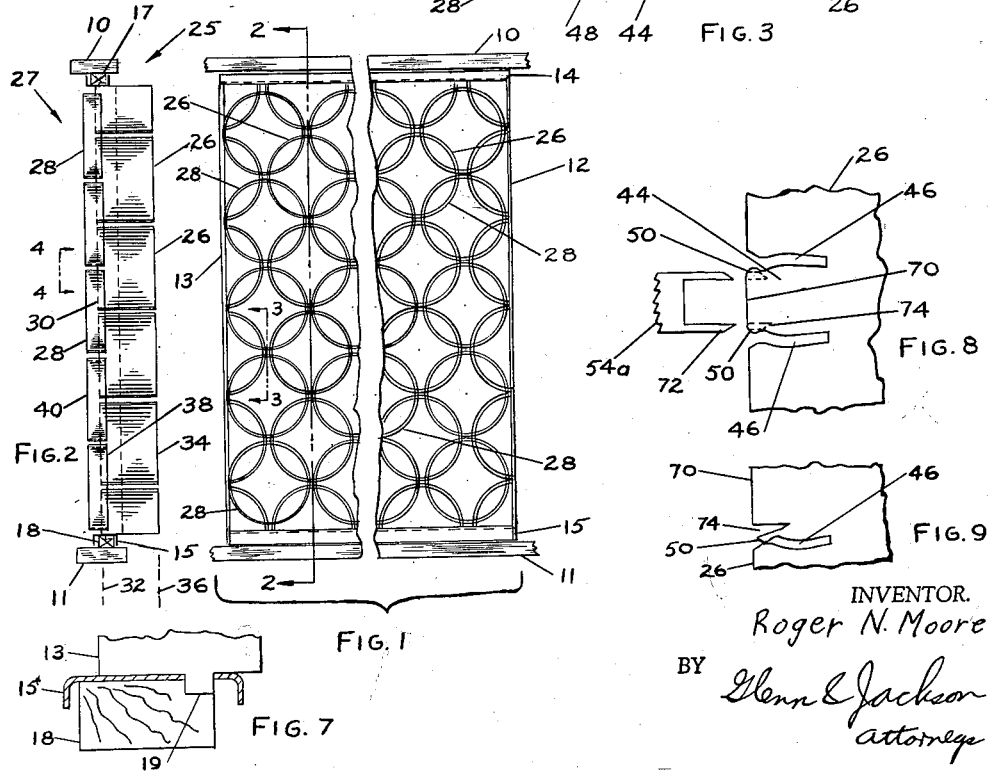
INVENTOR.
Roger N. Moore
BY Glenn & Jackson
attorneys

United States Patent Office 3,125,195
Patented Mar. 17, 1964

3,125,195
ARCHITECTURAL SCREEN
Roger N. Moore, Henrico County, Va., assignor to Reynolds Metals Company, Richmond, Va., a corporation of Delaware
Filed May 20, 1959, Ser. No. 814,633
7 Claims. (Cl. 189—82)

This invention is directed to an architectural screen and the like adapted to form a sun shade and/or decorative screen. This screen may be used in walls, window spaces, as room dividers, on patios, porches and for other uses of this nature.

According to this invention a very attractive and practical screen, or similar structure, is produced using sheet metal or extrusion, preferably made of aluminum or an alloy thereof, which is very light in weight, strong in structure and pleasing in appearance.

Such a structure effectively can be used in many places where ponderous masonry structures cannot be desirably placed or safely supported. The structures according to this invention can be easily and cheaply transported and installed without danger of cracking or breaking the structure and without danger to the workmen. They effectively diffuse sunlight and break intruding glances into the space screened thereby yet allow ample ventilation. They can be assembled at a factory and be cheaply transported to the place of use, or the components can be forwarded to a location near the place of use, and there be assembled without the necessity of skilled labor.

Accordingly, it is an object of this invention to provide a structure and method of construction in which a first layer of substantially parallel, double-ended tubes is connected to, or overlaps another layer of similar substantially parallel, double-ended tubes, the axes of the tubes of one layer being staggered with respect to the axes of the tubes of the other layer.

Another object of this invention is to provide a structure in which sheet or extruded metal tubes have deformable tongues between substantially parallel slots in the ends of such tubes, and in which there are other tubes each of which have cavities near one of their ends, these latter tubes being inserted into respective slots, and the tongues being thereafter deformed so portions of the tongues extend into the cavities to lock the tubes in place.

Further objects of this invention will become apparent as the description proceeds with reference to the accompanying drawings in which:

FIGURE 1 is an elevation of a screen embodying this invention, with parts broken away.

FIGURE 2 is a vertical cross-section taken along the line 2—2 of FIGURE 1.

FIGURE 3 is an enlarged cross-section taken along the line 3—3 of FIGURE 1.

FIGURE 4 is an enlarged elevation taken from the line 4—4 of FIGURE 2, with a locking tool indicated in dotted lines.

FIGURE 5 is a cross-section taken along the line 5—5 of FIGURE 3.

FIGURE 6 is an elevation of part of one of the tubes shown in FIGURE 3, before the tongue is deformed.

FIGURE 7 is an enlargement of a portion of FIGURE 2.

FIGURE 8 is a view similar to FIGURE 6, but showing another embodiment.

FIGURE 9 is a view similar to FIGURE 8, showing how the extension is cut and deformed outwardly.

FIGURES 1 and 2 show the structure of this invention used as a window or wall screen. A lintel is indicated at 10 and a sill at 11. The structure is placed within a frame which includes vertical metal panels 12 and 13, and an upper channel 14 and a lower channel 15. If desired, these channels may be secured respectively to wooden members 17 and 18. Each of the panels 12 and 13 has a tongue 19 at each end which passes through an opening in the channels 14 and 15, and the tongue 19 may be bent or otherwise locked to the respective channel. Any other type of framework may be used in lieu thereof.

The structure comprises a first flat layer 25 of parallel, double-ended, straight, sheet metal tubes 26, preferably of aluminum or an alloy thereof. A second flat layer 27 of parallel, double-ended, straight, sheet metal tubes 28, also preferably of aluminum or an alloy thereof, is placed adjacent to the first layer, so the tubes of one layer intersect and interlock the tubes of the other layer at their adjacent ends. The median planes of the two layers preferably are spaced apart in parallel relationship.

The axes of the tubes in each layer are transverse, or at right angles, to the broad sides of their respective layer. The axes of the tubes in one layer are staggered with respect to the axes of the tubes in the other layer. The layers overlap each other. The tubes may be cylindrical or approximately cylindrical, such as polygonal in cross-section, etc.

To this end, the tubes 26 of the first layer 25 have one set of their ends 30 lying adjacent a plane 32 indicated by dotted lines in FIGURES 2 and 3. The other set of ends 34 of the tubes 26 lie adjacent another plane indicated by the dotted lines 36 in FIGURES 2 and 3. The tubes 28 of the second layer 27 have one set of their ends 38 extending into the space between the planes 32 and 36 while the other set of their ends 40 lie outside of the space between the planes 32 and 36. This permits the two layers of tubes to overlap each other and to occupy more or less offset zones with respect to each other. Each of the ends 38 of the tubes 28 intersects a plurality (such as four) of the ends 30 of the tubes 26, and vice versa, and these tubes are secured to each other where they intersect and overlap.

The tubes 26 and 28 preferably have their intersecting ends interlocked and dovetailed. For example, each complete tube 26 has four deformable tongues 44, these tongues being spaced substantially 90° apart around the circumference of the end of the tube. Pairs of slots 46 are formed on each side of the tongue 44. Each of these slots 46 receives a portion 28a (FIGURE 3) of two tubes 28. The tubes 28 have cavities or holes 48 formed adjacent their ends 38. These holes 48 receive the extensions 50 at the end of the mating tongue 44, when such tongue is deformed outwardly by the flat slab-like tool 54 which has a rounded end 56 of larger diameter than the original diameter of notch 58 in the tongue 44 which is shown in FIGURE 6. This larger diameter of the edge of the tool 54 caused the extensions 50 in FIGURE 3 to be spread outwardly into the holes 48 when the tool 54 was moved to its fartherest rightward position. The tool in FIGURE 3 is shown as being removed from such fartherest rightward position after it has performed the spreading or deforming operation of the tongue 44.

The tubes 28 have pairs of notches 60 formed substantially at 90° intervals around the circumference of the tube ends 38. These notches 60 receive the corresponding ends 62 of the slots 46 to provide a dovetailing and locking construction between the tubes 26 and 28.

In the embodiment of FIGURES 8 and 9, the tube 26 has slots 46 and tongues 44 substantially of the same shape as shown in FIGURE 6 except that the end 70 of the tongue 44 of FIGURES 8 and 9 is straight across between the extensions 50. The tool 54a is somewhat similar to the tool 54, except that it has two relatively long, parallel cutting edges 72 which simultaneously cut the slots 74 in the tongue 44 and spread the extensions 50 outwardly, as shown in FIGURE 9, into the holes 48, FIGURE 3, of the rings 28. The working edge of the tool 54 and the cutting edges 72 of the tool 54a extend completely across to engage simultaneously two tongues 44 of adjacent rings 26. The transverse outline of tool 54 and/or 54a is shown in dotted lines in FIGURE 4 to show how such tools simultaneously engage the ends of two rings 26. These tools are insertable from the left hand side, in FIGURES 2, 3, 8 and 9, between the spaced portions of the rings 28 and simultaneously engage the two tongues of adjacent rings 26.

Some of the tubes are cut longitudinally where they engage the frame members 12–15, as shown in FIGURE 1. The edges of these cut portions are welded or otherwise secured, as by tongues, slots, etc., to the frame members. By way of example, the tubes 26 only are cut longitudinally, while tubes 28 and the spacing of the frame members 12–15 are so proportioned that the tubes 28 abut the frame members 12 and 13 tangentially and are slightly spaced from the frame members 14 and 15 without being longitudinally cut.

In assembling the structure, a plurality of tubes 26, such as four or more, are placed in a layer, on a platform, for example, so their ends 30 are directed upwardly and lie substantially in a common plane. Four of these tubes 26 are then locked together by downward axial movement of an engaging tube 28 which is forced through the proper notches 46 into a complete dovetailing and locking engagement of the character indicated in FIGURES 3, 5, 8 and 9. The remaining tubes of the structure are likewise dovetailed and locked. Preferably all of the necessary tubes 26 are first assembled on a platform, then the required number of tubes 28 are forced down into the proper notches 46, and then the tool 54 or 54a is forced down between the spaces of the rings 28 outwardly to deform the tongues 44 to cause the extensions 50 to enter the holes 48 and thus lock the tubes together.

Merely by way of example, the following dimensions are given for wall screens that have been found to be satisfactory. The outer diameters of the tubes 26 and 28 are 10 inches, and the thickness of the aluminum sheet material used in their construction is 0.125 inch. The length of the tubes 28 is 2¼ inches and the length of the tubes has been varied from 2¼ to 14 inches. The spacing of the tubes 26 at their closest points is 1 inch in radial direction. The same spacing distance is used for the tubes 28. The longitudinal overlap of the tubes 26 and 28 at ends 30 and 38 is 0.75 inch. A typical frame is approximately 142 inches in length between the inner faces of the vertical frame members 12 and 13 and 55 inches between the inner faces of the horizontal frame members 14 and 15. Other diameters for the tubes 26 and 28 have been used, such as 7½ inches, and the other dimensions of the structures made with such tubes have been correspondingly changed. Tubes of other diameters may be used.

While the embodiment now preferred has been disclosed, as required by the statutes, other embodiments may be used, all coming within the scope of the claims which follow.

What we claim is:

1. A structure comprising: a first flat layer of substantially parallel, double-ended, straight, sheet metal tubes with their axes transverse to the broad sides of said layer; and a second flat layer of substantially parallel, double-ended, straight, sheet metal tubes with their axes transverse to the broad sides of said second layer, each tube of one of said layers having an end provided with a pair of spaced slots and with deformable means disposed between said slots, each tube of said one layer receiving ends of a pair of tubes of the other layer in said slots thereof, said pair of tubes of said other layer having cavities adjacent their respective ends receiving said deformable means of said tube of said one layer to interlock said tubes together.

2. A structure comprising: a first flat layer of substantially parallel, double-ended, straight, sheet metal tubes with their axes transverse to the broad sides of said layer; and a second flat layer of substantially parallel, double-ended, straight, sheet metal tubes with their axes transverse to the broad sides of said second layer, each tube of one of said layers having an end provided with a pair of spaced slots and with means disposed between said slots, each tube of said one layer receiving ends of a pair of tubes of the other layer in said slots thereof, said pair of tubes of said other layer having cavities adjacent their respective ends receiving said means of said tube of said one layer to interlock said tubes together.

3. A structure comprising: a first flat layer of substantially parallel, double-ended, straight, sheet metal tubes with their axes transverse to the broad sides of said layer; and a second flat layer of substantially parallel, double-ended, straight, sheet metal tubes with their axes transverse to the broad sides of said second layer, each tube of one of said layers having an end provided with four pairs of slots and with deformable means disposed between each pair of slots, each tube of said one layer receiving ends of four tubes of the other layer in the slots thereof with each tube of the other layer having the end thereof received in adjacent slots of adjacent pairs of slots, said tubes of said other layer having cavities adjacent their respective ends receiving said deformable means of said tube of said one layer to interlock said tubes together.

4. A structure comprising: a sheet metal tube having an end with a deformable tongue between two substantially parallel slots; a pair of sheet metal tubes each with an end extending into said slots and each having a cavity adjacent their said respective ends receiving a deformed portion of said tongue to interlock said tubes together.

5. A method of manufacturing a structure comprising: forming a deformable tongue between two substantially parallel slots in the end of a sheet metal tube; forming a cavity near an end of each of two sheet metal tubes, and inserting said last named ends in said slots; and deforming a portion of said tongue into each of said cavities.

6. A method of manufacturing a structure comprising: assembling a plurality of sheet metal tubes each having two ends in a layer with one set of said ends lying adjacent a plane and with the other set of said ends adajcent another plane, said planes being substantially parallel; and placing another sheet metal tube having two ends with one of its ends extending into the space between said planes and intersecting all of the ends of said one set of said ends, and with its other end lying outside the space between said planes; and securing said intersecting ends together by deforming means of said other tube into cavities of said tubes of said layer, said means being located between a pair of slots respectively receiving the end of said tubes of said layer.

7. A method of manufacturing a structure comprising: assembling a plurality of sheet metal tubes each having two ends in a layer with one set of said ends lying adjacent a plane and with the other set of said ends adjacent another plane, said planes being substantially parallel; and placing another sheet metal tube having two ends with one of its ends extending into the space beteween said planes and intersecting and dovetailing with all of the ends of said one set of said ends, and with its other end lying outside the space between said planes; and securing said intersecting ends together by deforming means of said other tube into cavities of said tubes of said layer, said means being located between a pair of slots respectively receiving the end of said tubes of said layer.

References Cited in the file of this patent

UNITED STATES PATENTS

| | | |
|---|---|---|
| 529,719 | Eils | Nov. 27, 1894 |
| 663,351 | Mauser | Dec. 4, 1900 |
| 1,612,977 | Lundstead | Jan. 4, 1927 |
| 1,745,113 | Odell | Jan. 28, 1930 |
| 1,883,214 | Wilson et al. | Oct. 18, 1932 |
| 1,977,299 | Bates | Oct. 16, 1934 |
| 2,420,112 | Utzler | May 6, 1947 |
| 2,680,501 | Cunningham | June 8, 1954 |
| 2,765,159 | Garofalo | Oct. 2, 1956 |
| 2,854,103 | Kruger | Sept. 30, 1958 |
| 2,892,340 | Fort | June 30, 1959 |
| 2,918,995 | Kruger | Dec. 29, 1959 |